(12) United States Patent
Russell et al.

(10) Patent No.: US 6,740,139 B2
(45) Date of Patent: May 25, 2004

(54) AUTOMATED SYSTEM FOR DE-OXYGENATING AND DISPENSING SOLUTION

(75) Inventors: Todd Aldridge Russell, Grayson, GA (US); Milos Sidlo, Tucker, GA (US); Robert Donlon, Dacula, GA (US)

(73) Assignee: Novartis AG, Basel (CH)

( * ) Notice: Subject to any disclaimer, the term of this patent is extended or adjusted under 35 U.S.C. 154(b) by 7 days.

(21) Appl. No.: 10/153,047

(22) Filed: May 22, 2002

(65) Prior Publication Data

US 2003/0029317 A1 Feb. 13, 2003

Related U.S. Application Data

(60) Provisional application No. 60/292,980, filed on May 23, 2001, and provisional application No. 60/334,709, filed on Oct. 31, 2001.

(51) Int. Cl.[7] ............................................... B01D 19/00
(52) U.S. Cl. ........................ 95/8; 95/241; 96/156; 96/157; 137/15.05; 264/1.1
(58) Field of Search ........................ 96/156, 157; 95/8, 95/241; 137/15.05, 15.04; 264/1.1; 141/11, 69

(56) References Cited

U.S. PATENT DOCUMENTS

| 3,751,879 | A | 8/1973 | Allington | 55/158 |
|---|---|---|---|---|
| 4,315,760 | A | 2/1982 | bij de Leij | 55/46 |
| 5,281,579 | A | 1/1994 | Estep | 514/6 |
| 5,814,134 | A | 9/1998 | Edwards et al. | 96/6 |
| 5,922,249 | A | 7/1999 | Ajello et al. | 264/1.1 |

FOREIGN PATENT DOCUMENTS

EP 60065704 4/1985

OTHER PUBLICATIONS

European Search Report.

*Primary Examiner*—Duane Smith
*Assistant Examiner*—Douglas Theisen
(74) *Attorney, Agent, or Firm*—Jian Zhou; Robert Gorman; R. Scott Meece

(57) ABSTRACT

An embodiment of the invention is an automated system for transporting and deoxygenating a solution. The system is designed to: 1) transport a solution through a deoxygenating device 2) continuously monitor the oxygen content of the deoxygenated solution 3) collect the solution in a reservoir and automatically maintain solution level 4) automatically dispense the solution as requested and 5) perform automated solution prepare, startup, and shutdown operations.

14 Claims, 1 Drawing Sheet

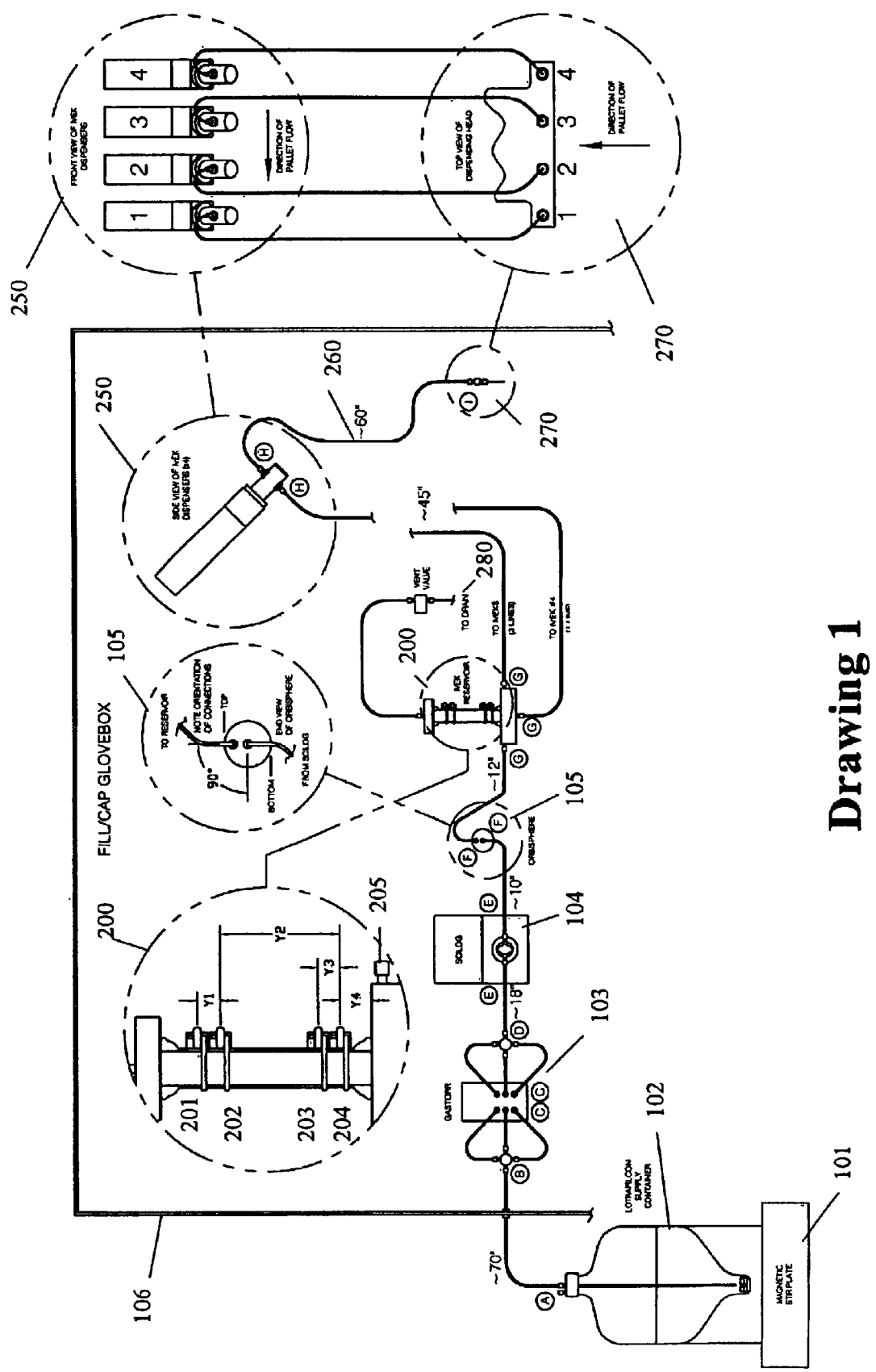

AUTOMATED SYSTEM FOR DE-OXYGENATING AND DISPENSING SOLUTION

The present invention claims the benefits under 35 USC §119 (e) of U.S. Provisional Patent Application Nos. 60/292,980 filed May 23, 2001 and 60/334,709 filed Oct. 31, 2001.

The present invention provides a system useful for transporting and deoxygenating a solution. This system is useful for a manufacture involving transportation and deoxygenation of a solution.

BACKGROUND

In recent years, a wide variety of research has been carried out to develop polymeric materials useful for making extended-wear contact lenses which affect minimally corneal health and give wearers maximal comfort. Ideally, extended-wear contact lenses would display high oxygen permeability, high ion permeability, good wettability, adequate on-eye movement, and tear exchange ability, all of which are required to maintain corneal health and wear comfort.

There have been many attempts to blend different polymers having different properties to make extended-wear lenses having some of the above-mentioned desired properties. For example, U.S. Pat. No. 5,849,811 teaches a process and polymer composition for making extended-wear lenses. The extended-wear lenses, made according to the methods disclosed in U.S. Pat. No. 5,849,811, can have a balance of oxygen permeability and ion or water permeability, with the ion or water permeability being sufficient to provide good on-eye movement, such that a good tear exchange occurs between the lens and the eye. U.S. Pat. No. 5,849,811 discloses that the ion and/or water permeability of lens materials may be increased by initiating and completing polymerization in an atmosphere which is substantially free of oxygen. Deoxygenating a polymer composition (formulation) and transporting the deoxygenated polymer composition (formulation) may be required in manufacture of such extended-wear lenses before making extended-wear lenses by molding.

Therefore, there is a need for a system and method for deoxygenating formulations and transporting deoxygenated formulations in an industrial setting for manufacturing contact lenses. Such system and method preferably can be adapted to automated practices and perform with consistency.

SUMMARY OF THE INVENTION

The object of the invention is to develop an automated system capable of deoxygenating the formulation, transporting the deoxygenated formulation, monitoring continuously the oxygen content in the formulation, maintaining the oxygen content in the formulation at a low level, and dispensing formulation into molds.

An embodiment of the invention is an automated system for transporting and deoxygenating a solution. The system is designed to: 1) transport a solution through a deoxygenating device; 2) continuously monitor the oxygen concentration of the deoxygenated solution; 3) fill the solution in a reservoir and automatically maintain solution level; 4) automatically dispense the solution as requested; and 5) perform automatically solution preparation, and start-up and shutdown operations.

The system of the invention comprising: a deoxygenating means, a pumping means, an oxygen analyzer, a solution collection system, a solution dispensing system, and a computer system, wherein the computer system: a) controls the pumping means to pump the solution from the container through the deoxygenating means in which oxygen is purged from the solution and through the oxygen analyzer which monitors oxygen concentration in the system and provides a feedback to the computer system to adjust operations of the system to ensure that the solution is properly deoxygenated; b) controls the deoxygenating means to deoxygenate the solution; c) controls the pump means to fill the solution collection system with the solution; and d) controls the solution dispensing system to drain the solution from the solution collection system and to dispense into each of one or more receivers a prescribed amount of the deoxygenated solution from the solution collection system.

Another embodiment of the invention is a method for displacing oxygen trapped in a solution collection reservoir of a system of the invention, comprising displacing oxygen with a deoxygenated first solvent which is miscible with a second solvent used in the solution.

A further embodiment of the invention is a method for deoxygenating and transporting a solution. The method comprises: displacing oxygen trapped in the above described system of the invention with a deoxygenated first solvent which is miscible with a second solvent used for preparing the solution; draining the deoxygenated first solvent from the solution collection system; replacing the deoxygenated first solvent in the system with the solution that is deoxygenated; and dispensing into each of one or more receivers a prescribed amount of the deoxygenated solution.

BRIEF DESCRIPTION OF THE DRAWING

Drawing 1 is a schematic representation of an automated system for de-oxygenating and dispensing a solution.

DETAILED DESCRIPTION OF THE PREFERRED EMBODIMENTS

A preferred embodiment of the invention is schematically shown in Drawing 1. Referring to Drawing 1, the system for de-oxygenating and dispensing a solution comprises a pumping means 104 (for example a SciLog® liquid pump) that can draw a solution from a container 102. The solution is mixed using a stirring means 101 (such as a magnetic stir plate) and pumped through a de-oxygenating mean 103 (e.g., a GASTORR in-line degassing device) and an oxygen analyzer 105 (e.g., an ORBISPHERE in-line oxygen analyzer). The concentration of oxygen in the solution is constantly monitored by the oxygen analyzer 105 and the information about the oxygen concentration is fed to a computer system (e.g., a HMI (human machine interface) computer, not shown) which controls the operation of the whole system. The computer system can adjust the speed of solution pumping so as to adjust the solution residence time in the deoxygenating means, according to the received information about the oxygen concentration. Longer residence time would remove more oxygen from the solution. Conversely, less $O_2$ would be removed from the solution for a shorter residence time. After being tested in the oxygen analyzer 105, the solution is fed into a solution collection system 200 which comprises multiple liquid level switches 201, 202, 203, and 204. A dispensing system 250 (for example, IVEK precision liquid metering and dispensing systems) pumps from the solution collection system 200 and dispenses a given amount of solution through tubing 260 to receivers e.g., lens molds (not shown) in a filling station 270. Preferably, the de-oxygenating mean 103, the pumping means 104, the oxygen analyzer 105, the solution collection system 200 and the dispensing system 250 are located inside a glove box 106 which is airtight and filled with an inert gas, for example, nitrogen or argon. The solution is dispensed into each of a plurality of receivers in a prescribed amount. The receivers are preferably located in a filling station 270 which is filled with an inert gas to have a positive pressure. The system can also further comprise a waste container 280 located inside the glove box.

Preferably, the solution collection system 200 can be a IVEK reservoir assembly and comprises four switches. These four switches are arranged as follow: the distance between switches 201 and 202 is no more than ⅝"; the distance between switches 202 and 203 about 3 and ⅜"; the distance between switches 203 and 204 about ⅝"; and the distance between switch 204 and draining level 205 about ⅞".

The system with a configuration as shown in Drawing 1 operates under computer control in the following modes:

PREPARE: In this mode, the solution supply container is replaced by one filled with ethanol. When the PREPARE button is selected at the HMI computer terminal, the SciLog® liquid pump draws ethanol from the container, through the GASTORR in-line degassing unit and ORBISPHERE in-line oxygen analyzer, and into the reservoir at 100% pump speed. The pump continues to fill the reservoir until the ethanol passes out the overfill line and begins to collect in a waste container inside the glove box. In this manner, any oxygen present in the system (up through the reservoir) is displaced by ethanol. Once the cycle has finished (as determined by a preprogrammed timer), the operator selects the ACKNOWLEDGE button at the HMI to complete the operation.

STARTUP: Following oxygen displacement, the system must be drained of all ethanol and replenished with deoxygenated formulation in preparation for dispensing into molds. In this mode, the ethanol container is replaced with the solution supply container, and the cycle is initiated by selecting the STARTUP button at the HMI. Once initiated, the IVEK dispenser pumps automatically turn on and drain the reservoir a prescribed amount past switch #4. During draining, the reservoir is automatically back-filled with nitrogen supplied from the slightly positive pressure glove box. Once empty, the system automatically performs a multi-step process to transition from ethanol to pure formulation by refilling and draining the reservoir as follows:
1. Fill to level switch #2 with formulation at 75% SciLog® liquid pump motor speed.
2. Drain reservoir and lines via IVEKs as described previously.
3. Fill to level switch #2 with formulation at 18% SciLog® liquid pump motor speed.
4. Drain the reservoir and lines via IVEKs as described previously.
5. Repeat steps 3 and 4 three (3) times, filling the reservoir to level switch #3 (rather than draining the reservoir) at the final refill.
6. Charge IVEK dispensers with formulation and refill reservoir to level switch #3 at 18% SciLog® liquid pump motor speed.

The HMI continuously monitors the output of the ORBISPHERE in-line oxygen analyzer during this operation to ensure that the formulation is properly deoxygenated. The system may begin automatic dispensing operations once the AKNOWLEDGE, AUTO CYCLE, and CYCLE START buttons have been selected at the HMI.

DISPENSE: As pallets fitted with clamp fixtures containing contact lens molds arrive at the filling station, all four IVEKs are automatically signaled to simultaneously dispense the prescribed amount of formulation into the first four awaiting lens molds. The dispensing head indexes across the pallet, filling the remaining molds until complete. Pallets leave the filling station once the filling and mold capping operations are complete. Dispensing continues on successive lens molds until the IVEK pump chambers are near empty. Following the last full shot dispense of the solution, all IVEKs simultaneously recharge their chambers by drawing the solution from the reservoir. The SciLog® liquid pump automatically refills the reservoir to switch #3 so as to maintain an adequate amount of deoxygenated solution for the next chamber refill. The deoxygenating/re-filling operation is complete well in advance of the next chamber refill operation.

The HMI monitors all reservoir switches during automatic operation for fault conditions. Switches #1 and #4 serve dual purposes as high/low liquid level alarms during automatic operation, and as level controls during SHUTDOWN and STARTUP commands respectively. In addition, the HMI once again monitors the status of the ORBISPHERE in-line oxygen analyzer to ensure that the solution is properly deoxygenated. Finally, the HMI continuously monitors idle status of the dispensing system and automatically dispenses shots on an interval timer to prevent unwanted material polymerization which would otherwise occur.

SHUTDOWN: Following completion of automatic operation the solution supply container is replaced with the ethanol container, and the cycle is initiated by selecting the SHUTDOWN button at the HMI. In a manner similar to the STARTUP operation, the system automatically performs a multi-step process to transition from formulation back to pure ethanol by draining and refilling the reservoir as follows:
1. Drain reservoir and lines via IVEKs as described previously.
2. Fill to level switch #1 with ethanol at 100% SciLog® liquid pump motor speed.
3. Repeat steps 1 and 2 three (3) times.
4. Drain reservoir to switch #3.

System operation is complete once the ACKNOWLEDGE button has been selected on the HMI.

What is claimed is:

1. A system for transporting and deoxygenating a solution, comprising a computer system, an in-line $O_2$ degassing device for purging $O_2$ from the solution under control of the computer system, an in-line oxygen analyzer for monitoring oxygen concentration and providing a feed back to the computer system to adjust operations of the system to ensure that the solution is properly deoxygenated, a solution collection system for collecting the properly deoxygenated solution, a solution dispensing system for draining the solution from the solution collection system and for dispensing into each of a plurality of receivers a prescribed amount of the properly deoxygenated solution from the solution collection system, and a liquid pump with adjustable motor speeds, wherein the liquid pump, under control of the computer system, pumps from the solution from a container through the in-line $O_2$ degassing device and the in-line oxygen analyzer to the solution collection system.

2. A system of claim 1, wherein the motor speed of the liquid pump is adjusted by the computer system according to the feedback from the oxygen analyzer to ensure that the solution is properly deoxygenated.

3. A system of claim 2, wherein the solution collection system and the solution dispensing system are located inside an airtight box filled with an inert gas to have a positive pressure.

4. A system of claim 3, wherein the solution dispensing system comprises a plurality of dispensing pumps which are capable of operating in parallel for dispensing the solution into the plurality of receivers.

5. A system of claim 4, wherein the solution collection system comprises multiple liquid level switches.

6. A system of claim 5, wherein the system further comprises a waste container for collecting waste, wherein the waste container is located in the airtight box.

7. A system of claim 6, wherein the in-line $O_2$ degassing device, the liquid pump and the in-line oxygen analyzer are located inside the airtight box.

8. A system of claim 7, wherein the inert gas is nitrogen.

9. A method for deoxygenating and transporting a solution, comprising the steps of:
   (a) providing a system for deoxygenating and transporting the solution, wherein the system comprises a computer system, an in-line $O_2$ degassing device for purging $O_2$ from the solution under control of the computer system, an in-line oxygen analyzer for monitoring oxygen concentration and providing a feed back to the computer system to adjust to ensure that the solution is properly deoxygenated, a solution collection system for collecting the properly deoxygenated solution, a solution dispensing system for draining the solution from the solution collection system and for dispensing into each of a plurality of receivers a prescribed amount of the properly deoxygenated solution from the solution collection system, and a liquid pump with adjustable motor speeds, wherein the liquid pump, under control of the computer system, pumps from the solution from a first container through the in-line $O_2$ degassing device and the in-line oxygen analyzer to the solution collection system;

displacing oxygen that is trapped in a system for deoxygenating and transporting the solution, with a first solvent which is miscible with a second solvent used for preparing the solution, wherein the displacing oxygen is performed by connecting a second container including the first solvent and filling the system with the first solvent while deoxygenating the first solvent;

(c) replacing the second container with the first container including the solution;

(d) replenishing the system by draining all of the first solvent in the system and by filling the system with the solution while deoxygenating the solution until the solution collection system is filled with the properly deoxygenated solution; and (e) dispensing a prescribed amount of the deoxygenated solution into each of a plurality of receivers.

10. A method of claim 9, wherein the solution collection system and the solution dispensing system are located inside an airtight box filled with an inert gas to have a positive pressure.

11. A system of claim 10, wherein the solution dispensing system comprises a plurality of dispensing pumps which are capable of operating in parallel for dispensing the solution into the plurality of receivers.

12. A system of claim 11, wherein the solution collection system comprises multiple liquid level switches.

13. A system of claim 12, wherein the system further comprises a waste container for collecting waste, wherein the waste container is located in the airtight box filled with the inert gas.

14. A method for displacing oxygen trapped in a solution collection reservoir, comprising displacing oxygen with a deoxygenated first solvent which is miscible with a second solvent used in a solution.

* * * * *